(12) United States Patent
Pollara

(10) Patent No.: US 6,797,324 B2
(45) Date of Patent: Sep. 28, 2004

(54) GLASS PRINTING PROCESS

(76) Inventor: Nicholas J. Pollara, 102 Prospect St., Woburn, MA (US) 01801

( * ) Notice: Subject to any disclaimer, the term of this patent is extended or adjusted under 35 U.S.C. 154(b) by 0 days.

(21) Appl. No.: 10/331,222

(22) Filed: Dec. 30, 2002

(65) Prior Publication Data

US 2003/0224108 A1 Dec. 4, 2003

Related U.S. Application Data

(60) Provisional application No. 60/384,257, filed on May 31, 2002.

(51) Int. Cl.[7] ............... B05D 3/10; B05D 3/12; B05D 5/06
(52) U.S. Cl. .............. 427/271; 427/272; 427/275; 427/287; 101/129; 65/60.3
(58) Field of Search ............... 427/271–273, 427/275, 282, 287; 101/129; 65/60.3, 61, 62

(56) References Cited

U.S. PATENT DOCUMENTS

| | | | |
|---|---|---|---|
| 3,220,878 A | * | 11/1965 | Pines |
| 4,323,351 A | | 4/1982 | Goldsmith |
| 5,669,951 A | | 9/1997 | Eichhorn |
| 5,730,052 A | * | 3/1998 | Mather |
| 6,214,424 B1 | * | 4/2001 | Chubb et al. |

FOREIGN PATENT DOCUMENTS

| | | | |
|---|---|---|---|
| JP | 01310990 A | | 12/1989 |
| JP | 10-194782 | * | 7/1998 |

\* cited by examiner

*Primary Examiner*—Fred J. Parker
(74) *Attorney, Agent, or Firm*—Kenneth L. Milik

(57) ABSTRACT

A process for creating a visible pattern on a frosted glass article to give the appearance of selective frosting of the glass article. A clear glass substrate is uniformly roughened on one surface to create a uniform frosting effect and abrasion layer. Artwork for a desired visible pattern is created on a computer, and a silkscreen is prepared of the artwork. The silkscreen is used to transfer a clear ink to the substrate to fill in the abrasion layer in the desire visible pattern. The clear ink has an index of refraction close to glass, and the abrasion layer is essentially cancelled out or removed. The substrate is then cured in an oven until the ink is dry. The resulting glass substrate or glass article has the same appearance as if it had been entirely frosted, except for the desired visible pattern that appears clear and transparent to light. In another aspect of the present invention, a process is claimed for producing selectively frosted glass articles. In still another aspect, the printing process may be applied to any type of specular reflective surface, such as polished marble.

35 Claims, 10 Drawing Sheets

A. DIFFUSE RELECTOR

B. SPECULAR RELECTOR

GLASS PRINTING PROCESS

PRIORITY CLAIM

The present application claims priority to co-pending provisional application patent application entitled Glass Printing Process, Application No. 60/384,257, filed on May 31, 2002, and having a common inventive entity.

FIELD OF THE INVENTION

The present invention relates generally to a process for producing decorative frosted glass articles, and more particularly to a process for printing images and lettering on frosted glass to remove the effects of frosting, so that the printed areas appear transparent to light.

BACKGROUND OF THE INVENTION

In the manufacture of decorative glass and decorative glass articles, it is often desirable for the glass to have a frosted appearance. This frosted-glass effect is produced by roughening the surface of the glass, so that light passing through the surface becomes highly diffused. Frosted glass provides an aesthetically pleasing appearance due to its optically translucent quality, which transmits light but prevents the perception of distinct images. Because of the aesthetic quality of frosted glass, it is used in a wide range of glass articles of manufacture including glass panels, bottles, glassware, lighting fixtures, plaques, and decorative ornaments.

It is often further desirable to frost the surface of the glass article selectively, so that most of the glass surface has a frosting effect while some portions of the glass surface remain clear and transparent to light. In the manufacture of some glass bottles, for example, the entire surface of the bottle may be frosted except for designs, brand names, company logos, or other lettering, which remain unfrosted and clear. The effect produced by a transparent design or transparent lettering in a field of translucent frosted glass is aesthetically pleasing to the eye, and several manufacturers have adopted this technique for their products.

There are several commonly known methods for producing selectively frosted glass articles, such as abrasive blasting, acid frosting, and laser etching.

In the method of selective abrasive blasting, a stencil of the desired design or lettering is first produced using brass, steel, or a resilient material, such as rubber or vinyl. The stencil is brought into contact or otherwise aligned with the glass article in the position where the design or lettering is to be registered on the glass. The entire glass article is then abrasive blasted. In abrasive blasting, particulate material such as aluminum oxide grit is mixed with air and directed under high pressure to the glass surface, producing a roughening or abrading of the glass surface in all areas not covered by the stencil. The areas covered by the stencil remain clear and transparent.

Although this method is basically effective, there are several disadvantages. The process is slow and costly. Positioning and removing the stencils is a manual operation that requires a high skill level to achieve acceptable or uniform results. Also, the stencils are subjected to the sandblasting effects, reducing the usable life of the stencil. As the stencil degrades there is a corresponding loss of uniformity between glass articles being produced. Furthermore, because the stencil must have sufficient thickness to resist the effects of abrasive blasting, fine details in designs and lettering cannot be obtained. Abrasive blasting using rubber or vinyl is not suitable for high volume production of selectively frosted glass articles.

In the method known as acid frosting, an organic acid resist mask is deposited by screen printing or other means on the surface of the glass article in the desired design or lettering pattern. The acid resist mask is completely dried, and then the glass article is immersed in an acid bath. An acid such as hydrofluoric acid roughens the glass surface to achieve the frosting effect. The portion of the glass surface not covered with the acid resist mask will receive the frosted effect; the portion of the surface covered by the acid resist mask will remain clear. The glass article is then rinsed and the acid resist mask is removed by any of a number of known methods. In one method, the glass surface is soaked in a hot solvent to soften the mask material, and the surface is then rinsed with detergent until all the mask material is removed.

Although this method of selectively frosting glass achieves generally good results, the method has several disadvantages. The process requires heated screens for depositing the acid resist mask on the glass article. Therefore, precise temperature control must be maintained throughout the entire process. Also, the process is slow because it requires a period of drying before the next step in the operation can be performed. Finally, the removal of the mask material after the frosting process is time consuming and expensive. This is due to the use of hot solvents and the stage of rinsing with detergents, which may need be repeated until all of the mask material is removed.

Another known method for producing selective frosting of glass is laser etching. In laser etching, a computer controlled laser beam, guided by a graphics drawing and layout program, scans across the surface of the glass article and etches the desired design or lettering into the surface of the glass article. The burning off of the surface layer of the glass gives the design or lettering a frosted appearance. To achieve the effect where the whole glass article is frosted with only the desired design or lettering remaining clear, the laser beam, under computer control, scans and etches the entire surface of the glass article except for the area of the design or lettering.

Using laser etching to achieve selective frosting of glass has the disadvantage of requiring expensive specialized equipment. Also, when the majority of the surface is to be frosted, laser etching is a very slow and time-consuming process, because the entire surface of the glass article must be scanned by the laser. The number of finished glass articles produced per unit time is small and the process is not suitable for volume production.

There exists a need for a method of producing the same desired effect of selective frosting of glass without the drawbacks present in the prior art. There is a need for a method of achieving the effect of selective frosting of glass which is also cost-effective and reliable and which can be practiced with a minimum of specialized expensive equipment and specialized preparations and techniques. The present invention overcomes the disadvantages of the prior art.

SUMMARY OF THE INVENTION

A solution to the problems of prior methods of selectively frosting glass is provided in the glass printing process of the present invention, which uses screen printing technology to cancel out or remove the effects of frosting from a glass substrate or from a manufactured glass article in a selected pattern.

The present invention is useful for creating any type of visible pattern on frosted glass including images, letterings, logos, and designs, giving the appearance of selective frosting of the glass article. Furthermore, the effect of the present invention is achieved in a reliable, cost-effective manner, which can be accomplished without the highly specialized equipment and complex processes in the prior art. The process of the present invention may be used to produce glass panels, bottles, glassware, lighting fixtures, plaques, trophies, decorative ornaments and any other glass articles producible by the methods disclosed in the prior art.

In the claimed glass printing process, a glass substrate or manufactured glass article is uniformly frosted on one surface by any conventional frosting process, such as abrasive blasting, chemical etching, or by mechanically abrading the surface. For example, in the abrasive blasting process, fine particles of grit impact the glass surface under pressure, causing an abrasion layer on one surface of the glass. The abrasion layer consists of sharp irregularities in the glass surface. The abrasion layer has the effect of refracting all light rays passing through the layer, giving the glass its frosted appearance. Upon completion of the abrasive blasting process, all or a selected portion of one side of a glass substrate is frosted or roughened, while the other side remains smooth.

In the next step, a silkscreen is created which carries the selected pattern. The silkscreen may be advantageously created using a computer program, a printer, and conventional silkscreen fabrication methods.

The prepared silkscreen or stencil is then mounted in a silkscreen press in alignment with the frosted glass substrate. A clear ink or epoxy in then deposited by screen printing, using a squeegee, onto the frosted surface of the glass substrate in the desired pattern carried by the silkscreen.

The clear ink or epoxy is selected to have an index or refraction which is approximately equal to the index of refraction of the glass substrate, and the ink is deposited to a depth which is at least equal to the depth of the abrasion layer or frosting. Upon completion of the printing operation, the glass substrate is removed from the printing stand and then cured. Alternatively, UV curable clear inks may be used. When the ink or epoxy has been cured, the glass printing process of the present invention is completed.

The resulting glass substrate or glass article has the same appearance as if it had been entirely frosted, except for the desired visible pattern that appears clear and transparent to light. In principle, the clear ink fills in the surface irregularities of the abrasion layer in the pattern carried by the silkscreen. Since the index of refraction of the clear ink is the approximate to the index of refraction of the glass substrate, the irregularities in the abrasion layer are essentially cancelled out or removed. Therefore, light passing though the printed regions of the glass substrate is [not] no longer diffused. The glass in the regions of the printed pattern appears clear, as if the frosting effect in those regions was never present.

In another aspect of the present invention, a process is claimed for producing selectively frosted glass articles. The glass article is first frosted on an entire predefined surface, and then the frosting effect is selectively removed by depositing clear ink on the glass article in a predetermined pattern.

In still another aspect of the present invention, a method is claimed for producing visible patterns on frosted glass. A visible pattern is selected and clear ink is deposited on the frosted glass in the selected pattern to cancel out or remove the frosting effect.

In still a further, the printing method is applied to transparent plastic articles and materials. The present invention may be effectively used with substrates made of plastics including acrylics and polycarbonates.

In an alternative embodiment, the printing process is applied to any type of specular reflective surface, such as polished marble. The polished surface is first roughened, and clear ink is then deposited by a silkscreen in a desired visual pattern. The clear ink restores the specular reflective appearance in the area of the printed visual pattern.

BRIEF DESCRIPTION OF THE DRAWINGS

The foregoing and other objects, features and advantages of the invention will be apparent from the following more particular description of a preferred embodiment of the invention, in conjunction with the accompanying drawings. In the drawings.

DESCRIPTION OF THE PREFERRED EMBODIMENTS

Figure 1:
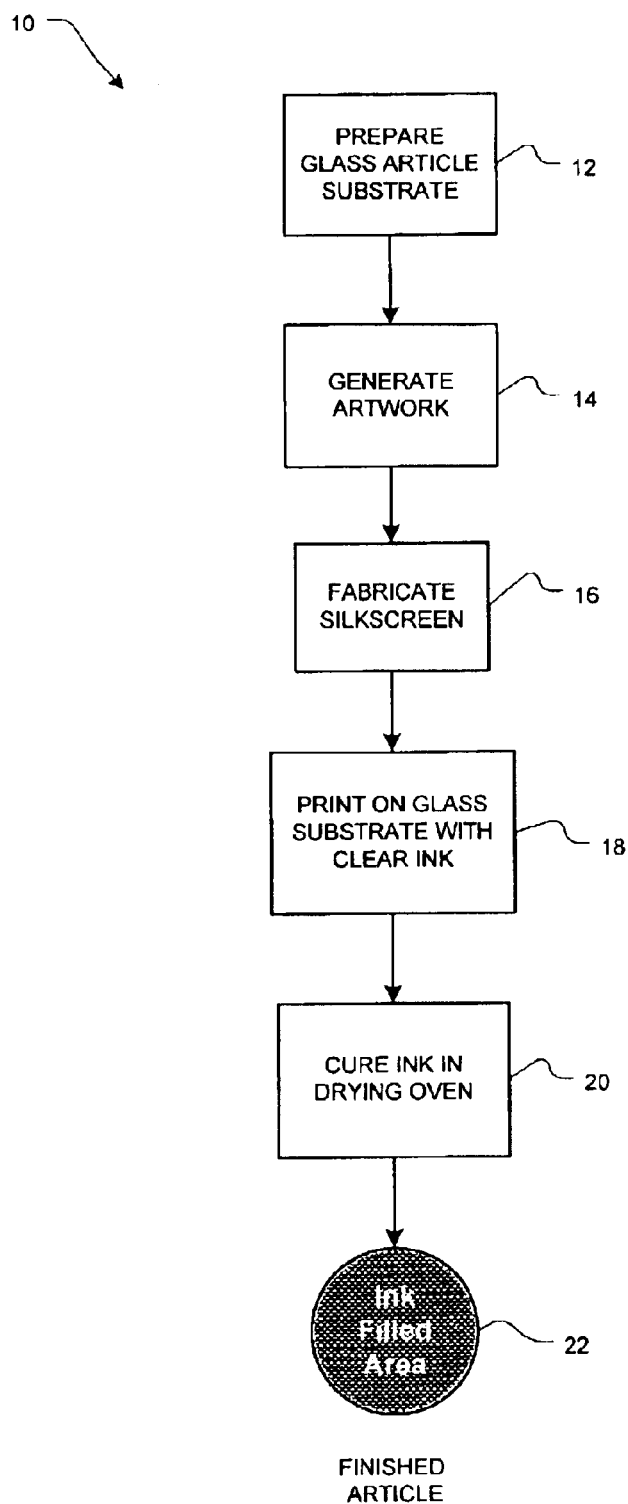
FIG. 1 is a flow chart of the glass printing process of the present invention.

Referring initially to FIG. 1, a process 10 for printing on glass is shown in flowchart form, in accordance with the present invention, which will produce glass articles having the finished appearance of selective frosting of glass. For illustrative purposes in the description that follows, the printing process 10 describes the creation of a decorative ornament called a sun catcher, consisting of a frosted-glass disk carrying clear lettering or images therein. It is to be understood that the glass printing process 10 of the present invention may be used on all types of glass articles, including flat glass panels, bottles, glassware, lighting fixtures, plaques, trophies, decorative ornaments and any other glass articles producible by the methods disclosed in the prior art. Furthermore, the printing process 10 of the present invention is useful in creating any type of visible patterns on frosted glass, including images, letterings, logos, patterns, and designs.

As shown in the flowchart of FIG. 1, in the first step 12, a glass article substrate is prepared having one frosted side by a conventional glass manufacturing process. In the second step 14, artwork in the form of the desired visible pattern is generated for printing on the glass substrate. In the third step 16, a silkscreen for printing is fabricated from the artwork. In the fourth step 18, the artwork carried by the silkscreen is printed by conventional screen printing techniques on the glass substrate using clear ink. In the fifth step 20, the ink is cured in a drying oven to form the finished glass article 22.

Figure 2:
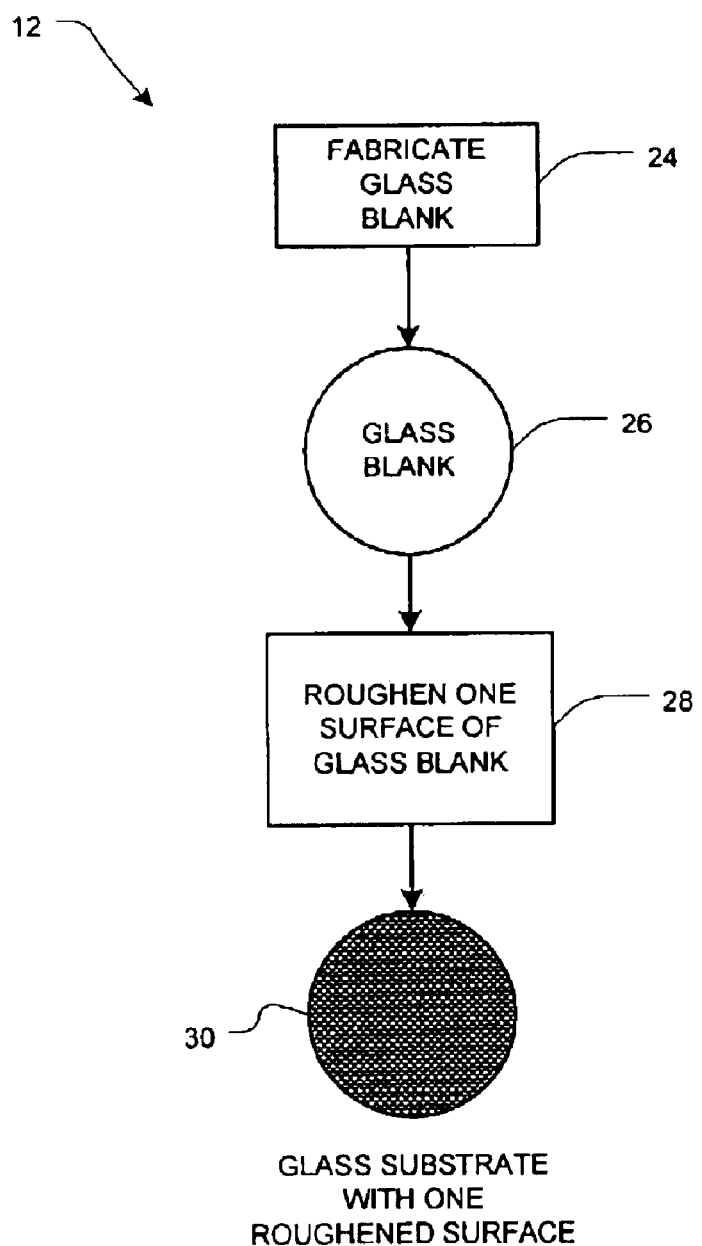
FIG. 2 is a flowchart showing the process of preparing the glass substrate for use in the printing process of the present invention.
Figure 3:
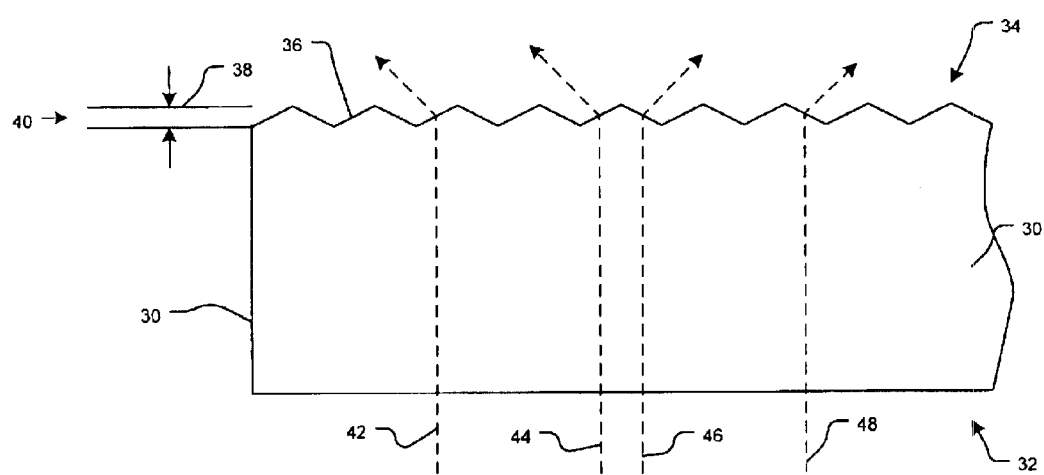
FIG. 3 illustrates the physical and optical characteristics of the frosted glass substrate for use in the printing process of the present invention.

Turning now to FIG. 2 and FIG. 3, the preparation of the glass substrate is shown in more detail. FIG. 2 is a flowchart showing the process 12 of preparing the glass substrate for use in the printing process 10 of the present invention. The process 12 of preparing the substrate begins with the fabrication 24 of a glass blank 26 by conventional glass manufacturing techniques. In the sun catcher of the illustrated embodiment, the glass blank 26 is in the form of a clear glass 3.5-inch diameter disk, which is initially smooth on both sides.

The glass blank 26 is next subjected to a roughening process 28, which roughens one surface of the glass blank 26 and creates the frosted-glass effect. The frosting of the smooth glass can be accomplished by abrasive blasting, chemical etching, or by mechanically abrading the selected surface. In the preferred embodiment, abrasive blasting is used. In the abrasive blasting process, fine particles of grit mixed with air impact the glass surface under pressure, causing abrasions in the surface of the glass. The two dominant materials currently used in abrasive blasting are aluminum oxide and silicon carbide. In the preferred embodiment, 180-grit aluminum oxide is used in a siphon sandblaster set at 80 pounds per square inch. Alternatively, frosted glass may be obtained "off the shelf" from most glass suppliers. Upon completion of the roughening process 28, one side of the glass blank 26 is frosted or roughened, while the other side remains smooth, forming the glass substrate 30, which is used in the printing process 10 of the present invention. In the manufacture of certain products, it will be desirable to abrade only a selected portion of the first surface of the substrate 30.

Turning now to FIG. 3, the glass substrate 30 is illustrated in more detail, showing in particular the effects of the roughening process 28. FIG. 3 presents an exaggerated cross-sectional view of one edge of the glass substrate 30, after the roughening process 28 has been completed. As shown in the figure, the bottom surface 32 of the glass substrate 30 remains smooth, while the top surface 34 is shown to include abrasions 36 or irregularities caused by the impact of abrasive particles on the top surface 34 during the roughening process 28. In FIG. 3 and other figures, the abrasions 36 on the top surface 34 appear as uniform indentations, for illustration purposes. In actual practice, the abrasions 36 will vary in size and in depth.

The abrasions 36 on the top surface 34 of the glass substrate 30 penetrate the top surface 34 to form an abrasion layer 38 of surface irregularities that diffuse the light rays passing through it. The irregularities forming the abrasion layer 38 penetrate the top surface 34 to depth 40. The depth 40 of the abrasion layer 38 is defined as the distance between the highest and lowest points (peaks and valleys) in the abrasions. The depth 40 of the abrasion layer 38 is a measure of the fineness or coarseness of the top surface 34, and it can vary depending on the size of the grit particles used in the roughening process 28. The depth 40 of the abrasion layer 38 has an effect on the aesthetic appearance of the glass. If a very fine grit is used for abrasive blasting, the depth 40 of the abrasion layer 38 will be small and the frosting will appear smooth and uniform. If a coarse grit is used for abrasive blasting process, the depth 40 of the abrasion layer 38 will be larger and the frosting effect will appear deeper and rougher, much like sandpaper. A coarse grit will require more ink for printing, as will be described further on.

The abrasion layer 38 has the effect of refracting light rays 42, 44, 46, 48 passing through the substrate 30 as shown in the figure. The light rays are refracted in various directions, depending on the irregularities in the abrasion layer. Light passing though the abrasion layer 38 is therefore highly diffused, giving the glass substrate 30 its frosted appearance. In practicing the present invention, the depth 40 of the abrasion layer 38 is generally not critical, but the depth 40 needs to be generally uniform over the entire top surface 34 to achieve acceptable results.

Figure 4:
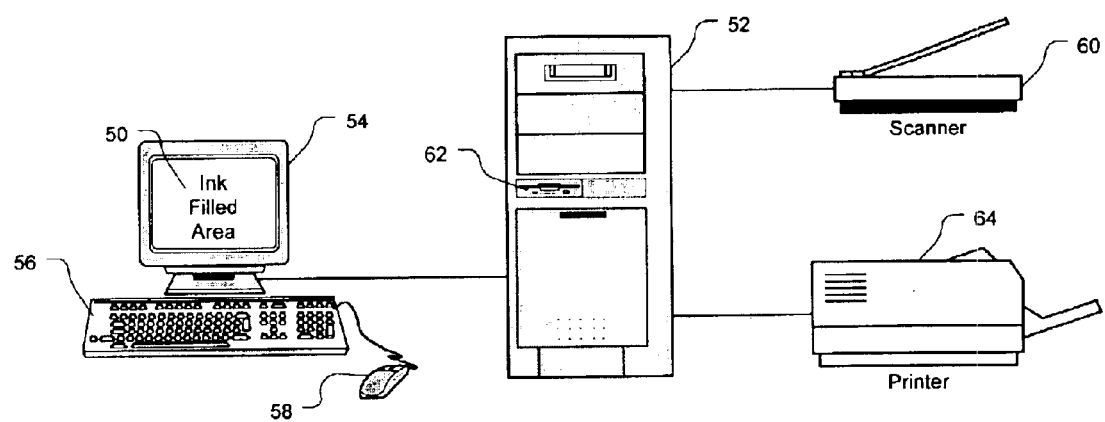
FIG. 4 shows the computer system components used in creating artwork for printing on glass according to the present invention.

FIG. 4 illustrates the step 14 of generating the artwork 50 for printing on the glass substrate 30. As shown, the artwork 50 is created preferably with a personal computer 52, having an attached monitor 54 for the display of the artwork 50, and an attached keyboard 56 and mouse input device 58. The personal computer 52 is programmed to run a drawing application program such as Corel Draw to facilitate the drafting of the artwork 50 by user-entered keystrokes and computer commands input into the personal computer 52 through the keyboard 56 and mouse 58.

Alternatively, the artwork may be input into the computer system by means of a scanner 60. For example, if it is desired to print a company logo onto the glass substrate 30, a company letterhead bearing the company logo may be input into the personal computer 52 by scanning the letterhead in the scanner 60. Alternatively, an artwork computer file may be provided on a floppy disk preferably in .eps or .cdr format, or any other suitable computer formats. The disk would be inserted into the personal computer's floppy disk drive 62. The artwork 50, when completed, is printed out on the attached printer 64 as will be described in what follows. Various printer types may be used, such as laser printers and inkjet printers.

Generally speaking, the higher the resolution of the artwork 50, the finer the detail that may be printed on the glass. In the preferred embodiment, the artwork is created at 200 dots per inch, which is somewhat dependent on the printer used.

However, the amount of detail that can be transferred to the glass substrate 30 during printing also depends on the surface texture of the substrate 30. A fine top surface 34 on the substrate 30 allows for finely-detailed images to be printed, whereas a coarse top surface 34 surface prevents the printing of highly-detailed images. The reason is that, when printing on coarse surfaces, a thicker layer of ink must be deposited in order to fill in the deeper valleys of the abrasion layer 38 on the substrate 30. The additional amount of ink will lead to a phenomena called dot gain. In dot gain, the individual dots making up the artwork 50 will spread out, and the fine details will be filled in by ink.

In general, acid-etched substrates allow for finely detailed images because the acid etching produces a very fine frosting effect, having a small abrasion layer depth 40. As stated in connection with FIG. 3, various degrees of coarseness may be achieved with abrasive blasting, depending on the use of coarse grits or fine grits in the abrasive blasting process, and each produces a distinct aesthetic appearance in the completed glass article. If the top surface 34 is too fine, the frosted appearance of the article will be diminished, and the contrast between the printed and unprinted areas will be less noticeable. If the top surface 34 is too coarse, the printing will lose much of its detail. Therefore, a judgment must be made depending on the aesthetic effect desired and the fineness of detail needed in the final image. For example, if the artwork is a finely-detailed company logo, the glass substrate 30 should be prepared with a finer or smoother top surface 34.

Figure 5:
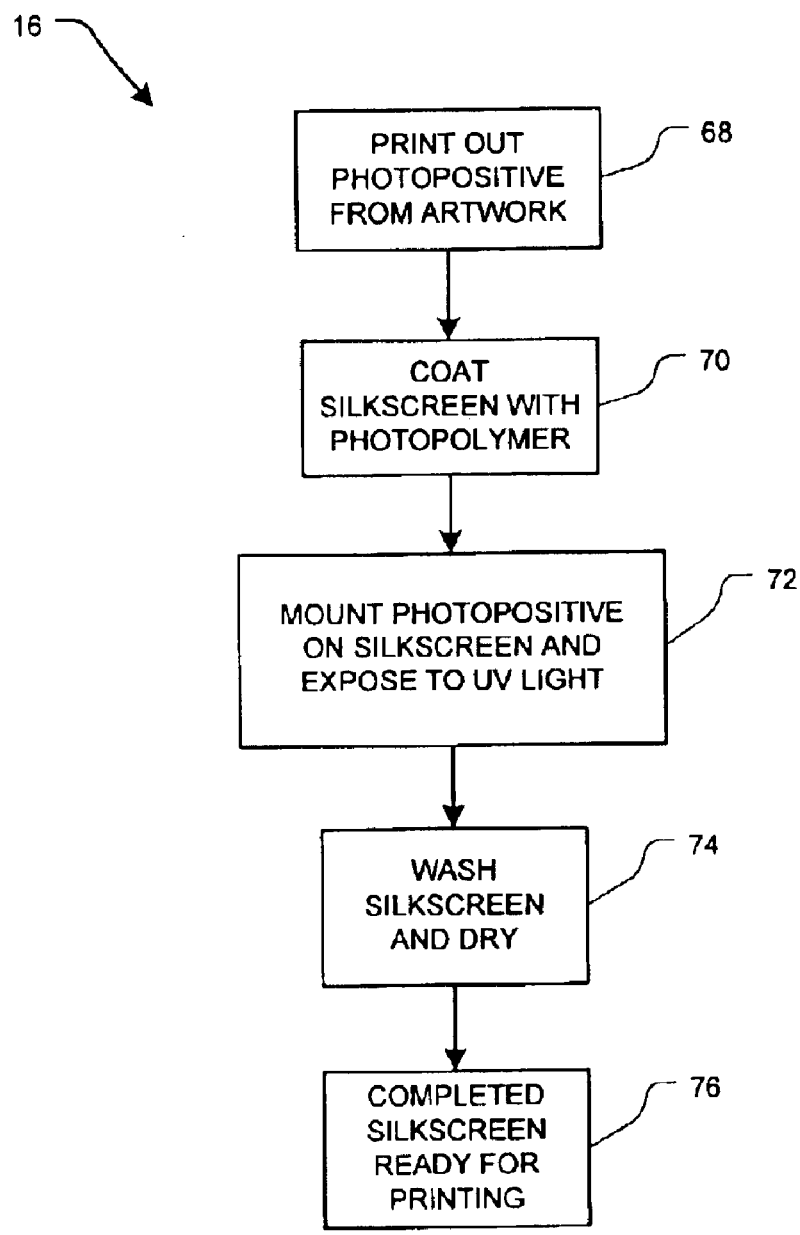
FIG. 5 is a flowchart of the process for preparing a silkscreen for printing on glass according to the present invention.

FIG. 5 illustrates in flowchart form the process 16 for creating a silkscreen for use in the printing process 10 of the present invention. The silkscreen is used to print an image of the artwork 50 onto the substrate 30 using clear ink or epoxy.

Various methods for creating silkscreens are well known in the art. In the preferred embodiment, a silkscreen is created in a simple and economical manner for use in printing small production runs of sun catchers, trophies, and similar glass articles. Referring to the figure, the artwork 50 is printed out from the personal computer 52 on a clear film or transparency to form a photopositive 68 of the artwork 50. The printer 64 used may be a laser printer or inkjet printer, and other specialized printers for creating photopositives may also be used. The clear film material is a coated plastic that will accept various inks, including inkjet inks. To create a photopositive 68, an image of the artwork 50 is printed in deep black ink on the clear film. The resulting photopositive 68 is opaque to UV light in areas occupied by the artwork 50 image and transparent to UV light in all other areas, which is essential to preparing the silkscreen.

In the next step, a silkscreen 70 is coated with a photopolymer. In the preferred embodiment, the silkscreen 70 is relatively small, which makes it suitable for creating sun catchers and small trophies. The preferred screen is an 8.5×12 inch OD wooden cap screen with 158 mesh. Larger screens with coarser or finer mesh can also be used to achieve acceptable results. The photopolymer, which is a photo emulsion or capillary film, is available in many off-the-shelf brands and is used to evenly coat the screen 70. The photopolymer has the property of being water soluble, unless exposed to UV light. When exposed to UV light, the photopolymer starts cross-linking to form a film that is no longer water soluble.

In the next step 72, the photopositive 68 is placed on the photopolymer-coated silkscreen 70 and exposed to a UV light source. When exposed to UV light, the photopolymer is cross-linked in every area of the screen that is not blocked by the photopositive of the artwork 50. The areas of the screen blocked by the photopositive remain water soluble. After exposure to UV light, the photopolymer silkscreen includes sections that are water soluble and sections that are not water soluble.

In step 74, the exposed silkscreen is brought to a water station and a high pressure water jet is used to dissolve away the water-soluble photopolymer, exposing all the holes in the screen that were covered by the photopositive. The ink will flow through those exposed holes in the screen. The silkscreen is then dried.

Once the completed silkscreen 76 is dry, it is ready for use in the printing process 10 of the present invention. After the printing is completed, the photopolymer in the silkscreen may be dissolved away, and the screen may be reused as desired.

Figure 6:
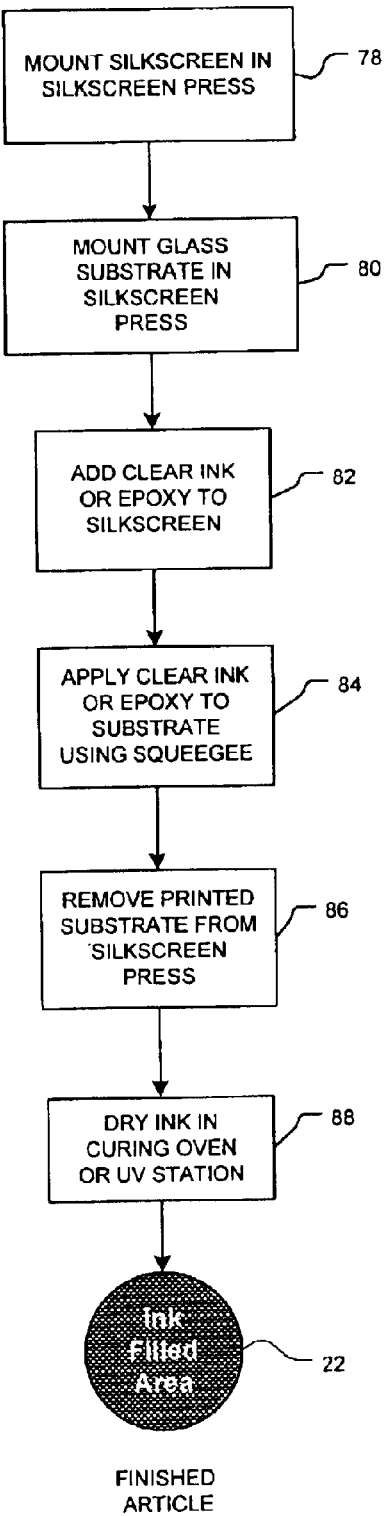
FIG. 6 is a flowchart of the process of applying ink according to the present invention.

Referring to FIG. 6, the printing 18 and curing 20 steps of the glass printing process 10 will now be described. In the preferred embodiment, the completed silkscreen 76 is mounted in a silkscreen press 78 with the screen mesh and photopolymer layer on the bottom. The silkscreen press 78 is in the form of a hinged-wooden frame. The silkscreen 76 is mounted on the hinged section of the silkscreen press 78, so that the silkscreen 76 may be raised and lowered onto the substrate 30 being printed. The wooden frame has a depth of approximately one inch; in addition to providing a structural support for the silkscreen 76, it provides a cavity for holding the ink.

In the next step 80, the glass substrate is mounted in the silkscreen press 78. In the preferred embodiment, a printing fixture is provided with a 3.5-inch diameter hole for holding a sun catcher substrate 30 in a stationary position during printing. Once the substrate 30 is mounted in the fixture, the fixture is then mounted in the silkscreen press 78, underneath the silkscreen 76. The silkscreen 76 is then lowered into the printing position. The substrate 30 is visible below the silkscreen 76 during the printing and may be easily aligned with the silkscreen 76 for proper registration of the ink. When lowered into its printing position, the silkscreen mesh is approximately one sixteenth of an inch from the top surface 34 of the substrate 30.

In the next step 82, ink is added to the silkscreen 76. The silkscreen 76, with its wooden or metal frame, has a certain depth and acts as a reservoir for the ink. The clear ink or epoxy is selected to have an index or refraction that is approximately equal to the index of refraction of the glass substrate. The index of refraction for common soda lime, or window glass is approximately 1.5. Because the applied layer of ink is very thin, as will be described, acceptable results will be attained if the index of refraction of the clear ink is only approximate to that of glass. Clear plastic materials, such as polycarbonates and acrylics, also have an index of refraction close to glass, and when these materials are used as substrates, the same clear inks can be used to achieve acceptable results.

The inks used to screen print artwork 50 onto the substrate 30 are clear inks, such as MB193 Overprint Clear available from Deco Chem of Mishawaka, Ind. The thickness of this particular ink requires that it be initially thinned with a product such as Metabond MB195 Retarder. In addition, to reduce the formation of bubbles, it is advantageous to add IHR2032 Bubble Breaker to the ink. In the preferred embodiment, the formula used is MB193 Overprint Clear ink plus ten percent Metabond MB195 Retarder plus three percent IHR2032 Bubble Breaker. This formula provides a satisfactory ink for printing for a period of about one hour, before the viscosity increases and ink becomes unusable. Therefore, additional retarder is periodically added to thin the ink as needed. Alternative inks may be used such as Nazdar SS27, which is also a single-part, heat-cured ink. The Nazdar SS27 ink has the same disadvantages as the Deco Chem MB193 ink, as it tends to become thicker during the printing process.

Another alternative is to use a two-part epoxy ink[s] such as the Nazdar ER-170 Clear. This epoxy has the same disadvantage as the Deco Chem MBI93 in that the viscosity is not constant. However, the advantage that epoxy inks have is that once the catalyst has been added they will air cure at room temperature. Without the requirement of higher temperature curing, epoxy inks can be used advantageously on plastics like acrylic and polycarbonate. When working with this epoxy ink, the base is mixed with the catalyst. Once mixed, it remains in liquid form for only a limited time. In the preferred embodiment, as a practical limit, the epoxy ink could be used only for two hours before the silkscreen 76 required cleaning.

As an alternative to the above-mentioned inks, UV curable inks may be used. This class of inks has the advantage of flowing smoothly and maintaining its original viscosity.

Another advantage with UV curable inks is that there is very little heat involved in the curing process, making them suitable for use on most plastics. The disadvantage is that UV curing requires more expensive equipment in the form of a conveyor and an intense source of UV light.

In the next step 84, the ink is applied to the substrate 30 using a standard rubber squeegee. With the silkscreen 76 lowered into the printing position over the substrate 30, the squeegee is dragged across the top of the silkscreen 76, pushing the ink though the holes in the silkscreen 76 and onto the glass substrate 30. The silkscreen 76 contacts the glass substrate 30 as the squeegee moves over it, depositing the ink onto the substrate 30 in the pattern of the artwork 50.

The ink deposited on the substrate 30 fills in the abrasion layer 38 on the top surface 34. The depth of the deposited ink must be at least equal to the depth 40 of the abrasion layer 38. If the amount of ink deposited does not completely fill in the abrasion layer 38, the artwork 50 image will not appear clear in the finished glass article. If too much ink is used, the ink will flow or run after the printing, depending on its viscosity, and the artwork 50 image will appear distorted. For example, in the case of lettering, the centers of capital R's and A's will be partly filled in, or there will be various blobs of ink evident in the printed artwork. Therefore, the ink should minimally fill in the abrasion layer 38, but not exceed this requirement by much. If depth 40 of the abrasion layer 38 is small, as with a smooth or fine substrate 30, less ink is required. If the depth 40 of the abrasion layer 38 large, as with a coarse substrate 30, more ink is required.

The amount of ink deposited on the substrate 30 is controlled by a number of factors. The selection of the silkscreen 76 itself plays a role. Some silkscreens 76 have a fine mesh and some have a coarse mesh. Although the mesh size is generally chosen to provide a desired resolution for the printed artwork 50, the coarser mesh silkscreens 76 have larger holes and transmit more ink into the substrate 30 during printing.

Also, the amount of ink deposited on the substrate may be controlled during the fabrication of the silkscreen 76 by varying the amount of the photopolymer coating the screen. The coating of the photopolymer may be thin or thick, depending on the result desired. To deposit a greater amount of ink on the substrate 30 during printing, a thicker coating of photopolymer would be used on the silkscreen 76. To deposit a lesser amount of ink on the substrate 30, a thinner coating of photopolymer would be used. In practice, the thicker coating of photopolymer is achieved by double-coating the silkscreen 76.

Finally, the amount of ink deposited on the substrate 30 may also be controlled by the type of squeegee used. Some squeegees have sharp edges and some have round edges. This affects in a minor way the amount of ink that is pushed though the silkscreen 76 mesh during the printing stroke. Also, the squeegee may be dragged over the screen more than once to achieve a thicker deposit of ink on the substrate 30.

During the step 84 of applying the ink using the squeegee, the ink will gradually thicken over time. Therefore, the viscosity of the ink must be visually monitored, particularly when printing with the Deco Chem ink. Retarder will need to be added periodically to thin the ink, as previously described. The effect of the thickening of the ink is indicated when an insufficient amount of ink is transferred to the substrate 30. If too much retarder is added to the ink, bringing the viscosity to a lower than desirable level, the ink on the substrate 30 will run and the artwork 50 will be blurred. Because of the tackiness of the ink, bubbles are formed in the transfer of the ink from the silkscreen 76 to the substrate 30. If the bubbles persist on the printed substrate 30, an additional amount of the Bubble Breaker should be used. In the next step 86, upon completion of the printing, the silkscreen 76 is raised up, and the substrate 30 is removed from the silkscreen press 78 and then from the printing fixture. In the preferred embodiment, substrates 30 making up several sun catchers are accumulated and arranged on a tray. In the next step 88, curing of the ink is performed in a curing oven. With the particular ink formulations used, the ink must reach a temperature of at least 300 degrees Fahrenheit for ten minutes to be completely cured. Because curing of the Deco Chem and other inks of this type require that the substrates be heated in an oven at elevated temperatures, they cannot be used on most plastic substrates. As stated above, plastic substrates require epoxy inks or UV-cured inks. Epoxy inks are air-dried at room temperature. UV-curable inks generally require a curing station including a moving conveyor that carries the printed substrates 30 under an intense UV light, which causes the liquid ink to cross-link and solidify. Upon completion of the curing step 88, the ink has been dried to form the finished article 22.

Figure 7:
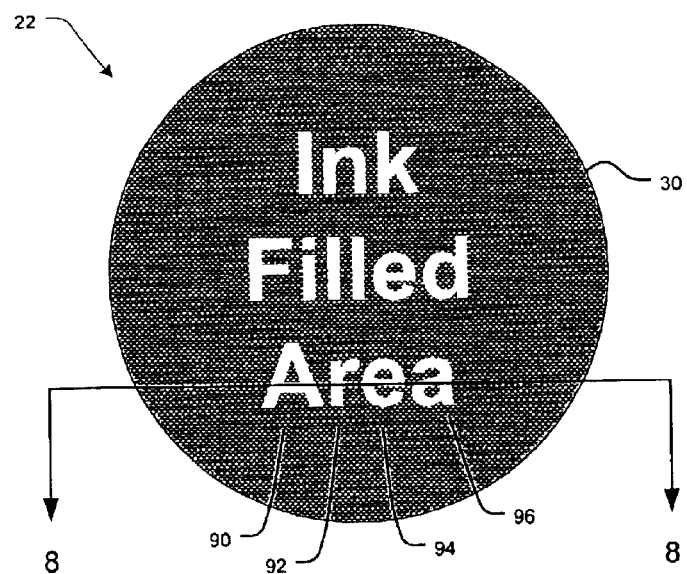
FIG. 7 is a top plan view illustration of the frosted-glass substrate after printing is completed.
Figure 8:
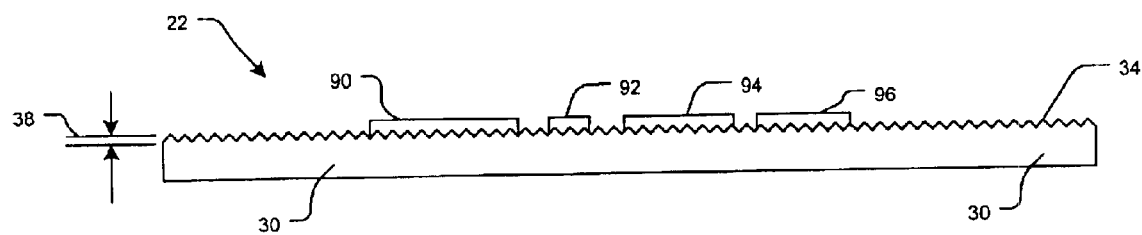
FIG. 8 is a sectional view of the frosted-glass substrate after printing, taken along the line 8—8 on FIG. 6.

Turning now to FIG. 7 and FIG. 8, the effect of the deposit of the ink on the frosted-glass substrate 30 is illustrated in more detail. FIG. 7 shows a top view of the finished glass article 22. In the figure, the finished article 22, in the form of the disk-shaped substrate 30, appears entirely frosted except for inked areas, in the form of lettering, which appear clear or transparent. FIG. 8 is a sectional view of the finished glass article 22, taken along the line 8—8 in FIG. 6, showing the deposit of the ink on the top surface 34 of the substrate 30 in the lettering for the word "Area." The ink deposits 90, 92, 94, 96 completely fill in the abrasion layer 38 on the top surface 34 of the substrate 30, according to the pattern carried by the silkscreen 76.

Figure 9:
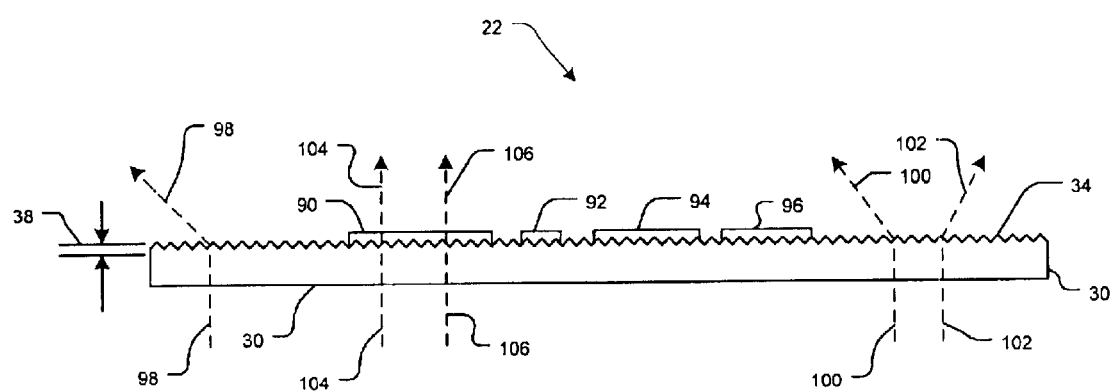
FIG. 9 is a sectional view of the frosted-glass substrate after printing, similar to that of FIG. 7, and showing the optical properties of completed substrate.

Referring now to FIG. 9, a sectional view of the finished glass article 22 is shown, which illustrates the altered optical properties of the glass substrate 30 caused by the deposits of clear ink. Light rays 98, 100, 102 passing through the top surface 34 of the substrate 30 are highly diffused by the irregularities in the abrasion layer 38 and bend at the surface 34 in various directions as shown. However, in the areas of the ink deposits 90, 92, 94, 96, the light rays 104, 106 pass straight through the substrate 30, just as with smooth glass. Since the index of refraction of the clear ink is close or equal to the index of refraction of the glass substrate 30, the irregularities in the abrasion layer 30 are essentially cancelled out or removed. Therefore, light rays passing though the printed regions of the glass substrate are no longer diffused. The glass in the regions of the printed pattern appear clear, as if the frosting effect in those regions was never present. The resulting glass substrate 30 or finished glass article 22 has the same appearance as if it had been entirely frosted, except for the desired visible pattern that appears clear and transparent to light.

Figure 10:
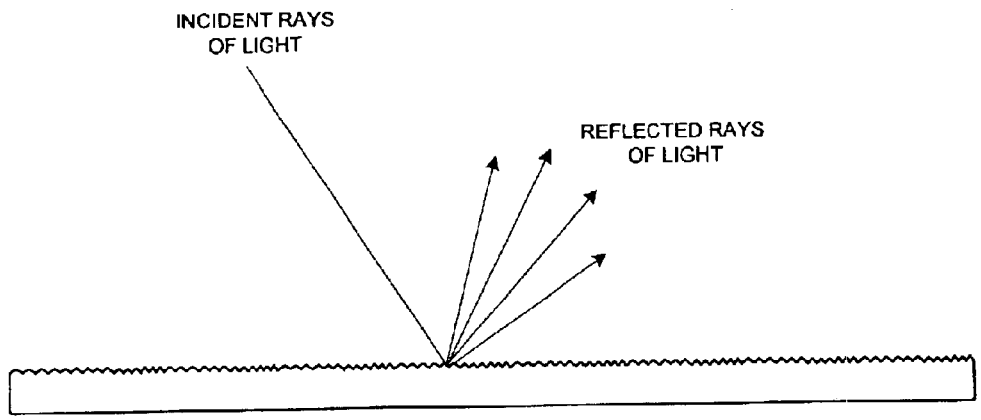
FIG. 10A and FIG. 10B illustrate the optical properties of diffuse reflectors and specular reflectors.
Figure 10:
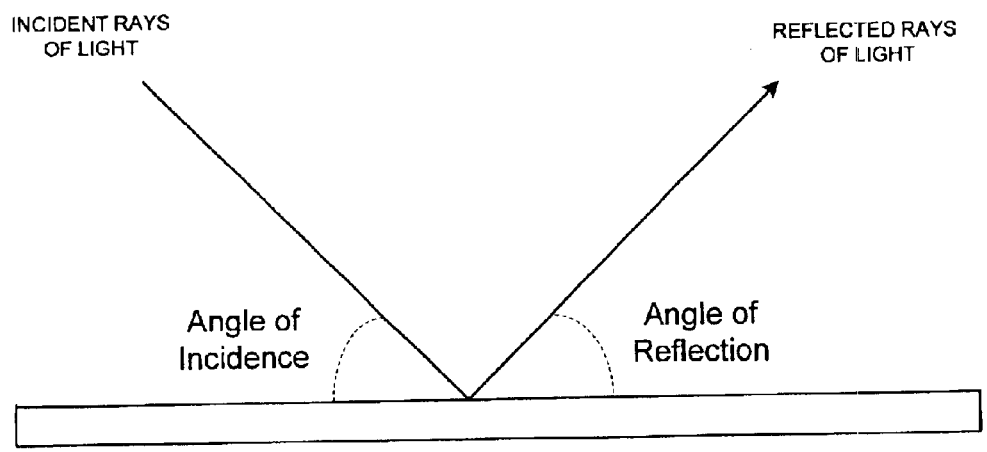
Figure 11:
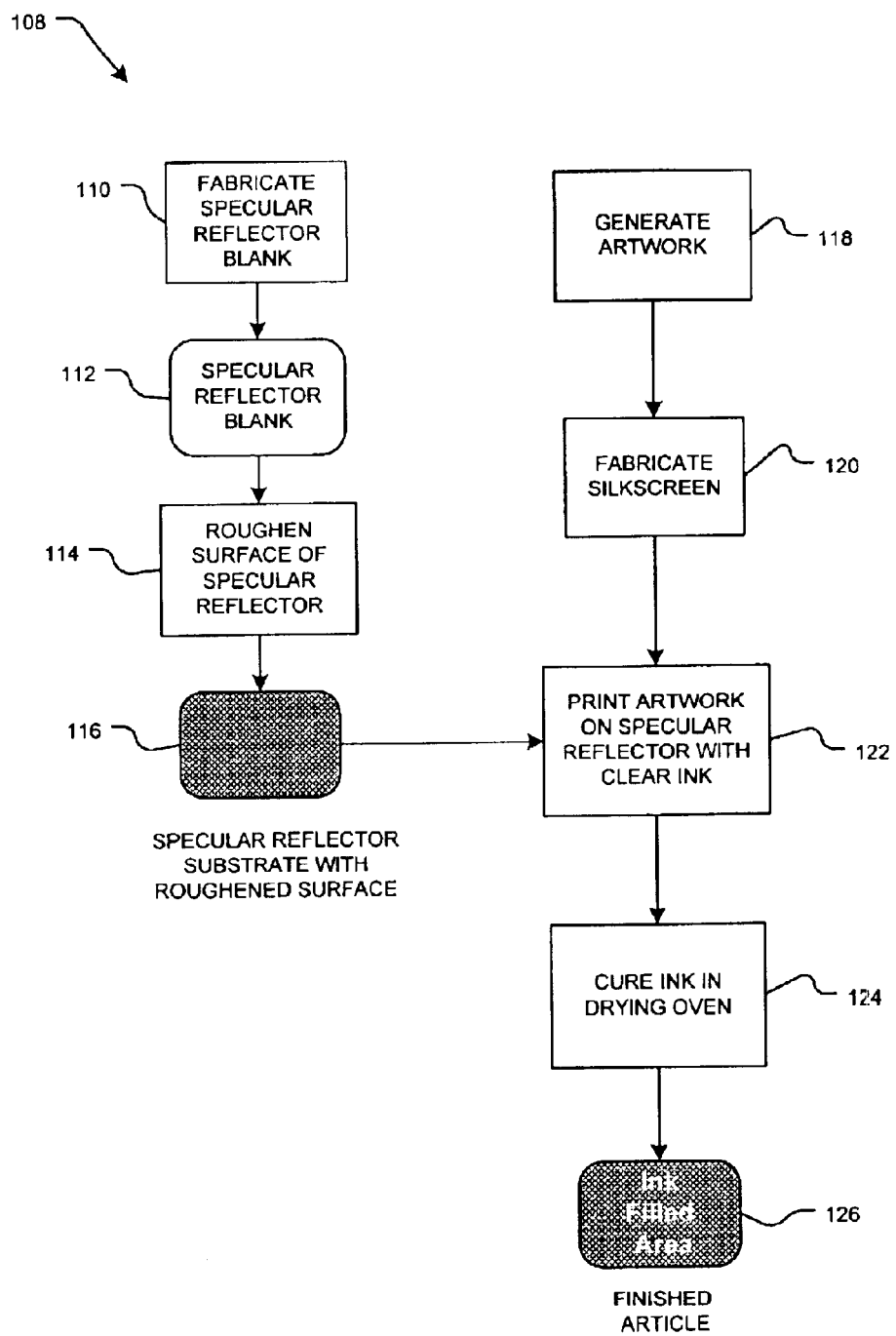
FIG. 11 is an alternative embodiment of the present invention, in which the principles of the present printing process are applied to marble and other specular reflectors.

Referring to FIG. 10 and FIG. 11, an alternative embodiment 108 of the printing process 10 is shown for printing on all types of specular reflector materials. Surfaces may be either diffuse reflectors or specular reflectors. In FIG. 10A, a diffuse reflector is illustrated, showing in particular how incident rays of light are reflected at various angles, caused by irregularities in the surface of the reflector. In FIG. 10B, a specular reflector is shown. Specular reflectors are materials with very smooth or glossy surfaces, which reflect rather than diffuse incident light. An example of a specular reflector is a mirror. With a specular reflector, the angle of incidence of a ray of light is equal, but opposite to the angle of reflection. In the present embodiment 108, the specular reflector material is polished marble, but it is understood that any specular reflector material may be used, including polished metals, polished marble and granite, plastics of various types, and simulated marble surfaces such Corian manufactured by Dupont Corp.

Quarried marble is cut and polished to have a smooth, shiny surface. The polished marble is a specular reflector, in that light incident on the surface at one angle will be reflected at the same, but opposite angle. In sunlight, for example, an image of the sun will be visible as a reflected bright spot in the surface of the marble.

As shown in the flowchart of FIG. 11, in the first step 110, a specular reflector blank 112 is fabricated. The specular reflector blank 112 is in the form of a finished article of manufacture. For example, the article may be a marble plaque with a highly polished surface, making it a specular reflector. In step 114, the polished surface of the blank 112 is roughened or abraded, creating an abrasion layer and making the surface a diffuse reflector, which is a similar effect to the frosting of glass. As a diffuse reflector, incident light rays are reflected in various directions, caused by the irregularities in the surface. Abrasive blasting may be advantageously used to roughen the surface of the specular reflector blank 112. After the roughening process 114, a specular reflector substrate 116 is ready for printing.

Steps 118 through 124 in the following description are the same as steps 14 through 20, described with reference to FIG. 1. In the step 118, artwork in the form of the desired visible pattern is generated for printing on the specular reflector substrate 116. In the next step 120, a silkscreen for printing is fabricated from the artwork. In the next step 122, the artwork carried by the silkscreen is printed by conventional screen printing techniques on the specular reflector substrate 116 using clear ink, which is the same ink used in the glass printing process 10. The clear ink fills in the abrasion layer, returning the smooth surface, so that the substrate 116 becomes a specular reflector in the areas where the ink was deposited. In addition, because the ink is clear, any variations in the color of the substrate, as it often occurs with marble and granite, will be visible enhancing its appearance. In the next step 124, the ink is cured in a drying oven to form the finished specular reflector article 126. The finished article 126 has an aesthetically pleasing appearance due in part to the contrast between the roughened, diffuse reflective surface of the substrate 116 and the smooth, specular reflective surface where the ink is present.

The description of the invention has been directed to certain exemplary embodiments. Various modifications of these embodiments, as well as alternative embodiments, will become readily apparent to those skilled in the art. Alternative methods to conventional silkscreening are contemplated for creating a printing stencil for the artwork. For example, a stencil blank having a wax coating intermixed with paper mesh may be printed in a thermal printer; the printer selectively melts the wax, creating holes in the paper mesh corresponding to the artwork. Also, other methods are known for depositing ink on the substrate 30 and are within the scope of the present invention. For example, pen plotters or other printing devices may be used to selectively print directly on the substrate. These and other modifications are within the scope of the present invention. Accordingly, the description is to be considered in all respects only as illustrative and not restrictive. The scope of the invention is indicated by the appended claims rather than by the foregoing description, and all changes that come within the meaning and range of equivalency of the claims are to be embraced within their scope.

What is claimed is:

1. A process for simulating selectively-frosted glass articles, comprising the steps:

selecting a transparent substrate having first and second smooth surfaces;

abrading a portion of the first surface of the substrate to produce an abrasion layer having a depth;

selectively depositing clear ink on the abraded portion of the first surface in a predetermined pattern to form a clear ink layer at least equal to the depth of the abrasion, layer, the clear ink having an index of refraction approximately equal to the index of refraction of the substrate; and curing the clear ink until it dries;

wherein the predetermined pattern appears as a transparency within the abraded portion of the first surface.

2. A process for simulating selectively-frosted glass articles as recited in claim 1, wherein the predetermined pattern is an image.

3. A process for simulating selectively-frosted glass articles as recited in claim 1, wherein the predetermined pattern includes alphanumeric symbols.

4. A process for simulating selectively-frosted glass articles as recited in claim 1, wherein the substrate is frosted plate glass.

5. A process for simulating selectively-frosted glass articles as recited in claim 1, wherein the substrate is a clear plastic material.

6. A process for simulating selectively-frosted glass articles as recited in claim 1, wherein the index of refraction of the clear ink is approximately 1.5.

7. A process for simulating selectively-frosted glass articles as recited in claim 1, wherein the clear ink is clear epoxy ink.

8. A process for simulating selectively-frosted glass articles as recited in claim 1, wherein the step of abrading includes abrasive blasting.

9. A process for simulating selectively-frosted glass articles as recited in claim 1, wherein the abrading includes chemical etching.

10. A process for simulating selectively-frosted glass articles as recited in claim 1, wherein the abrading includes mechanical abrading.

11. A process for simulating selectively-frosted glass articles as recited in claim 1, wherein the step of selectively depositing includes the steps of:

preparing a silkscreen with the predetermined pattern;

positioning the silkscreen in contact with the first surface of the substrate; and applying the clear ink to the silkscreen with a squeegee.

12. A process for simulating selectively-frosted glass articles as recited in claim 11, wherein the predetermined pattern is created with a computer drawing program.

13. A process for simulating selectively-frosted glass articles as recited in claim 1, wherein the clear ink is clear ultraviolet curable ink.

14. A process for producing an image on frosted glass to simulate the effect of selectively-frosted glass, the glass having a frosted side including an abrasion layer having a depth, and a smooth side, comprising the steps:

creating an image with a computer drawing program;

printing the image;

forming a silkscreen from the printed image;

positioning the silkscreen into contact with the frosted side of the glass;

applying clear ink to the silkscreen to form a clear ink layer about at least equal to the depth of the abrasion layer on the frosted side of the glass in the pattern of the printed image, the clear ink having an index of refraction approximately equal to the index of refraction of the substrate; and curing the ink until it dries;

wherein the image is visible as a transparency in the frosting side of the glass.

15. A process for producing an image on frosted glass as recited in claim 14, wherein the image includes alphanumeric symbols.

16. A process for producing an image on frosted glass as recited in claim 14, wherein the frosted glass is an ornament.

17. A process for producing an image on frosted glass as recited in claim 16, wherein the frosted glass is disk-shaped.

18. A process for producing an image on frosted glass as recited in claim 14, wherein the frosted glass is part of a trophy.

19. A process for producing a visible pattern on a glass substrate to simulate the effect of selectively-frosting, comprising the steps:

abrading a portion of the surface of the substrate to produce a frosted effect;

selecting a clear ink having an index of refraction similar to the index of refraction of the substrate;

depositing the clear ink on the frosted surface in a predetermined pattern to form a clear ink layer at least equal to the depth of the abrasions; and curing the clear ink until it dries.

20. A process for producing a visible pattern on a substrate as recited in claim 19, wherein the predetermined pattern is an image.

21. A process for producing a visible pattern on a substrate as recited in claim 19, wherein the predetermined pattern includes alphanumeric symbols.

22. A process for producing a visible pattern on a substrate as recited in claim 19, wherein the substrate is plate glass.

23. A process for producing a visible pattern on a substrate as recited in claim 19, wherein the substrate is a clear plastic.

24. A process for producing a visible pattern on a substrate as recited in claim 19, wherein the clear ink is clear epoxy ink.

25. A process for producing a visible pattern on a substrate as recited in claim 19, wherein the step of abrading includes abrasive blasting.

26. A process for producing a visible pattern on a substrate as recited in claim 19 wherein the abrading includes chemical etching.

27. A process for producing a visible pattern on a substrate as recited in claim 19, wherein the abrading includes mechanical abrading.

28. A process for producing a visible pattern on a substrate as recited in claim 19, wherein the step of depositing includes the steps of:

preparing a silkscreen with the predetermined pattern;

positioning the silkscreen in contact with the first surface of the substrate; and applying the clear ink to the substrate with a squeegee.

29. A process for producing a visible pattern on a substrate as recited in claim 28, wherein the predetermined pattern is created with a computer drawing program.

30. A process for producing a visible pattern on a substrate as recited in claim 19, wherein the clear ink is clear ultraviolet curable ink.

31. A process for creating a decorative glass ornament comprising the steps:

fabricating a glass substrate having a predetermined shape and first and second sides, the first side being frosted;

selecting an image for incorporating into the surface of the ornament;

preparing a silkscreen of the selected image;

positioning the silkscreen into contact with the first side of the glass substrate;

applying clear ink to the first side of the substrate in the pattern of the selected image to form a clear ink layer at least equal to the depth of the frosting; and curing the clear ink until it dries to form a completed ornament.

32. A process for selectively removing the frosting effect from a frosted glass article, the article having an abrasion layer on at least one surface, comprising the steps:

selecting a desired pattern;

applying clear ink to the frosted surface of the article to form a clear ink layer at least equal to the depth of the abrasion layer; and curing the clear ink until it dries.

33. A process for creating a pattern on a specular reflective substrate, comprising the steps:

abrading a selected portion of a first surface of the substrate to produce a frosted effect and an abrasion layer;

selectively depositing a clear ink on the first surface in a predetermined pattern to form a clear ink layer at least equal to the depth of the abrasion layer; and curing the clear ink until it is dry.

34. A process for creating a pattern on a specular reflective substrate, as recited in claim 33, wherein the clear ink has an index of refraction approximately equal to 1.5.

35. A process for creating a pattern on a specular reflective substrate, as recited in claim 33, wherein the substrate is polished marble.

* * * * *